United States Patent [19]
Callahan

[11] 3,820,589
[45] June 28, 1974

[54] MODULAR MULTIZONE ZONE LOGIC CONTROL CENTER

[75] Inventor: George C. Callahan, Liverpool, N.Y.

[73] Assignee: Carrier Corporation, Syracuse, N.Y.

[22] Filed: Nov. 15, 1972

[21] Appl. No.: 306,966

Related U.S. Application Data

[62] Division of Ser. No. 131,153, April 5, 1971, Pat. No. 3,709,769.

[52] U.S. Cl. .................................... 165/2, 165/26
[51] Int. Cl. .......................................... F25b 29/00
[58] Field of Search............. 165/2, 25, 26; 236/1 B

[56] References Cited
UNITED STATES PATENTS
3,242,978  3/1966  McGann ............................. 165/25

*Primary Examiner*—Charles Sukalo
*Attorney, Agent, or Firm*—J. Raymond Curtin; Donald F. Daley

[57] ABSTRACT

A control system for utilizing a single, low voltage thermostat to actuate a plurality of heating means or a plurality of cooling means.

1 Claim, 3 Drawing Figures

MODULAR MULTIZONE ZONE LOGIC CONTROL CENTER

CROSS REFERENCE TO RELATED APPLICATION

This application is a division of my co-pending application Ser. No. 131,153, filed Apr. 5, 1971, now U.S. Pat. No. 3,709,769 granted Jan. 9, 1973.

BACKGROUND OF THE INVENTION

In many air conditioning installations, the room thermostat is utilized to control a plurality of devices such as gas valves, motor contactors or relays, solenoid valves, etc. To simplify the air conditioning installations, it is desirable to utilize a low voltage control circuit. However, the number of devices such as valves and relays which can be controlled by a single low voltage circuit is limited.

For example, many air conditioning installations utilize a 24 volt class II control circuit as defined by the National Electric Code. For a 24 volt circuit, current may not exceed 3.2 amperes. As a matter of practice, most circuits are designed with a 40 VA maximum or stated another way, maximum current is ordinarily restricted to 1.66 amperes. Further, the thermostats ordinarily employed in air conditioning control systems are designed for low current flow therethrough.

As a result, many air conditioning systems employing a number of relays and valves which must be controlled by a single thermostat utilize line voltage for the control circuit. Special line voltage thermostats, relays and valves are employed in line voltage control circuits. This increases both installation and component costs.

SUMMARY OF THE INVENTION

This invention realtes to a control system for a heating and cooling apparatus employing a plurality of cooling means for cooling air and a plurality of heating means for heating air, at least two of the cooling means and at least two of the heating means being adapted to serve a single zone, the control system including temperature responsive means located in one of the zones served by the heating-cooling apparatus, the temperature responsive means being connected to a first control circuit which includes means for supplying electrical current thereto. A first electrically actuated control means in the first control circuit is provided to energize first cooling means to supply cool air to the zone served by the temperature responsive means. A second electrically actuated control means in the first control circuit is provided to energize first heating means to supply heated air to the zone served by the temperature responsive means.

A second control circuit including means to supply electrical current thereto is provided with a third electrically actuated control means adapted to be energized by the first control means to energize second cooling means to supply cool air to the zone served by the temperature responsive means. A fourth electrically actuated control means is provided in the second control circuit, the fourth control means being energized by the second control means to energize second heating means to supply heated air to the zone served by the temperature responsive means.

DESCRIPTION OF THE PREFERRED EMBODIMENT

Figure 1:
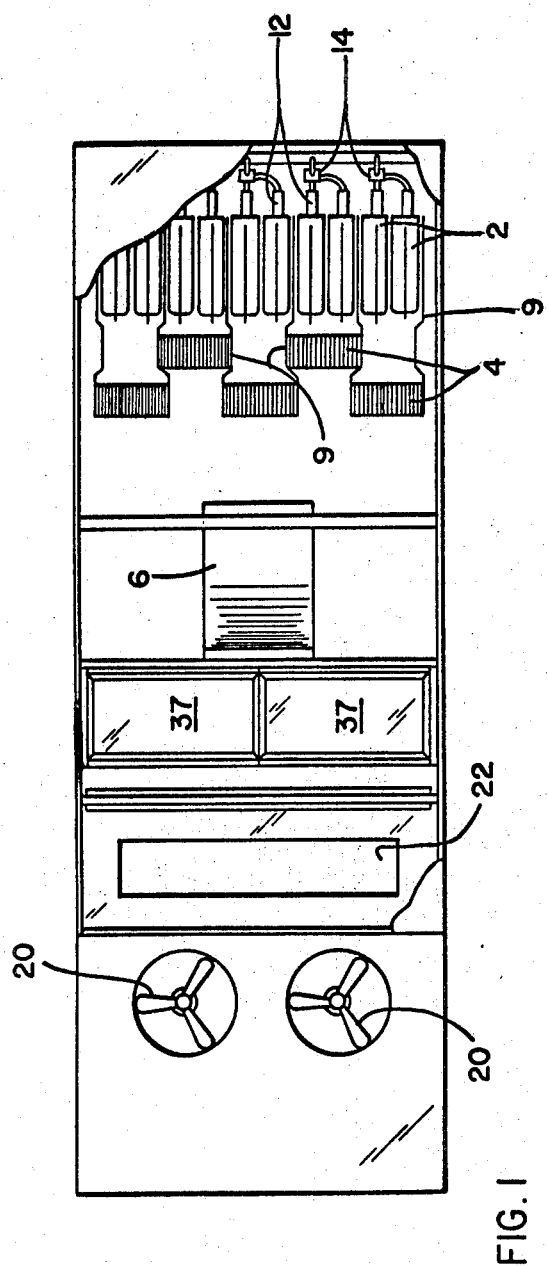
FIG. 1 is a plan view of an air conditioning apparatus with portions of the cover broken away to illustrate internal components.

Referring to the drawings, there is illustrated an air conditioning apparatus adapted to serve a plurality of zones in a building to provide individual temperature control in each zone without the use of dampers, damper actuators, etc. A plurality of direct-fired heat exchangers 2 for heating air and a plurality of refrigerant coils 4 are provided. A fan 6 and fan motor 7 are provided to circulate air over the evaporator coils and heat exchanger. Suitable switch means 8 (FIG. 3) are provided to complete the electrical circuit to fan motor 7 to energize the motor.

Figure 2:
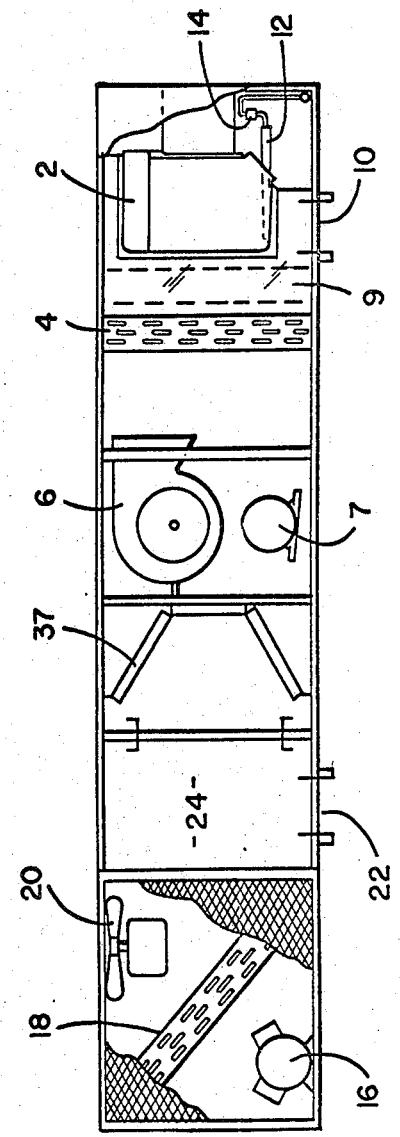
FIG. 2 is a view partly in section and partly in elevation of the apparatus of FIG. 1.

The unit illustrated is adapted to serve up to five individual zones. To accomplish this, baffles 9 are located to provide five separate air passages downstream from fan 6. Each passage contains a single refrigerant evaporator coil 4 and two direct fired heat exchangers 2. While a single evaporator coil and two direct-fired heat exchangers are illustrated in each air passage, it should be understood that any desired number of evaporator coils 4 and heat exchangers 2 could be located in each passage formed by baffles 9. Further, electric resistance elements or other well-known types of heating means could be employed in place of the direct-fired heat exchangers 2. Each air passage is provided with a discharge opening 10, only one of which is visible in FIG. 2.

The conditioned air from each discharge opening 10 may be supplied to the individual zone to be served thereby. While each passage containing an evaporator coil 4 and two heat exchangers 2 may serve a single zone, in many applications a number of discharge openings may be connected to a common duct to serve a zone requiring a greater heating and cooling capacity than could be provided by a single evaporator coil and two heat exchangers.

Each heat exchanger 2 is provided with a fuel burner 12 and a fuel valve 14 adapted for energization by thermostatic control means located in each zone served by the air conditioning apparatus.

A refrigerant compressor 16 and a condenser 18 are provided to supply liquid refrigerant to the evaporator coils 4. Each evaporator coil 4 is provided with a refrigerant liquid line solenoid valve LLS (FIG. 3) to control the flow of refrigerant from the condenser 18 to the coils. The liquid line solenoid valves LLS are also controlled by thermostatic control means located in each zone served by the air conditioning apparatus. Fan means 20 are provided to circulate ambient air over condenser 18 to condense the refrigerant therein.

Air from the individual zones is returned to the apparatus through opening 22 into a chamber 24. Fan 6 draws air from chamber 24 through filter 37 for passage over heat exchangers 2 and evaporator coils 4 prior to passage to the individual zones.

Figure 3:
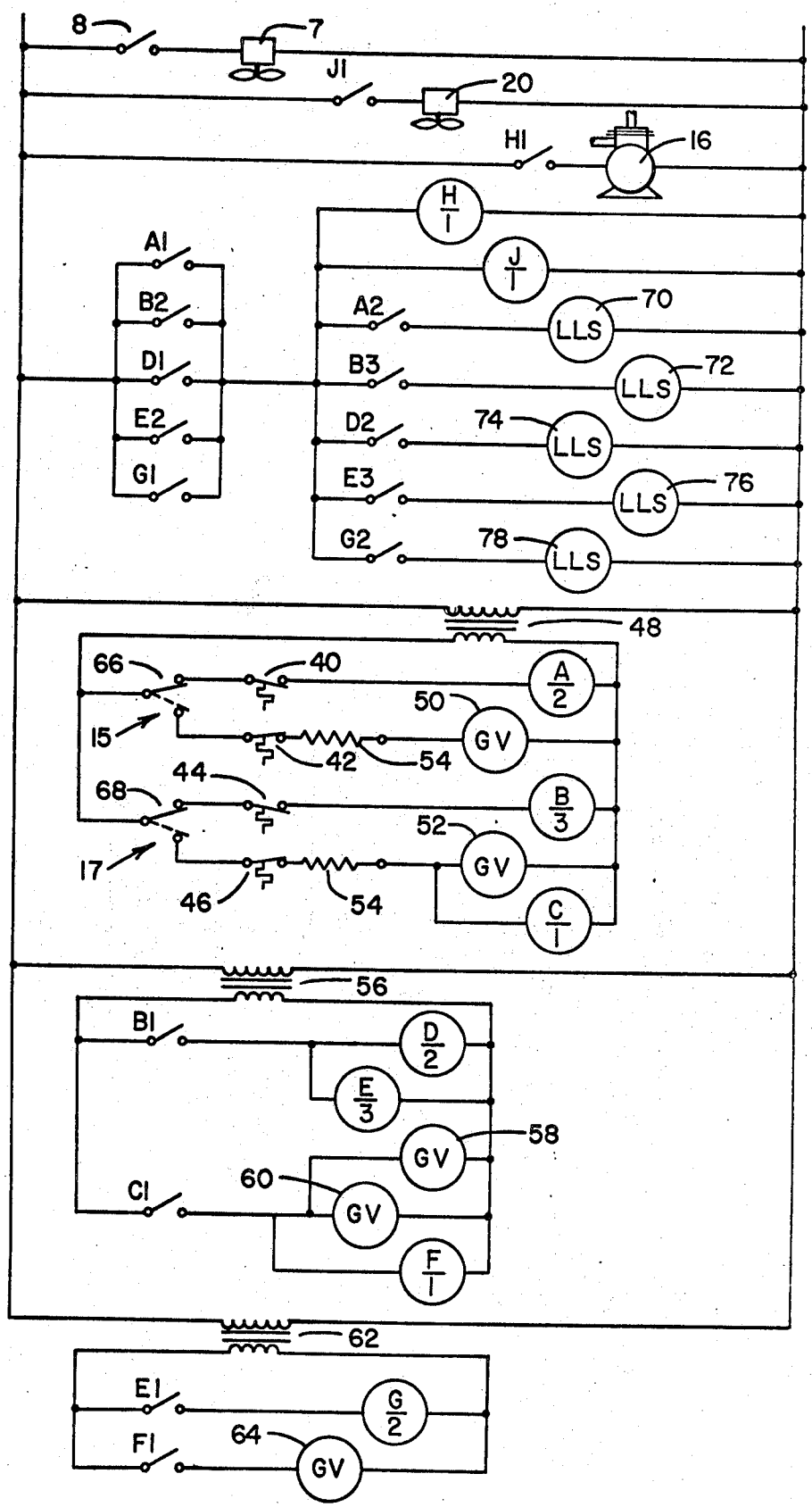
FIG. 3 is a schematic view of the control system for the air conditioning apparatus of FIGS. 1 and 2.

FIG. 3 illustrates a control arrangement for the aforementioned air conditioning apparatus for an installation wherein the apparatus is adapted to serve two zones, one zone being served by a single evaporator coil 4 and the two heat exchangers associated therewith, the second zone being served by the remaining four evaporator coils 4 and the eight heat exchangers 2 associated therewith.

Thermostatic control means 15 including temperature responsive switch 40 and temperature responsive switch 42 is disposed in the zone served by a single evaporator coil 4. Thermostatic control means 17, which includes temperature responsive switch 44 and temperature responsive switch 46, is disposed in the zone served by the remaining four evaporator coils. The thermostatic control means 15 and 17 are both connected in a first control circuit provided with 24 volt current by a transformer 48. The transformer 48 provides power to energize control relays A/2 and B/3, gas valves 50 and 52 and a gas valve relay C/1 including normally open swtich C1. Relay A/2 includes normally open switches A1 and A2. Relay B/3 includes normally open switches B1, B2 and B3. The total current requirement of the relays, gas valves and heat anticipators 54 within thermostatic control means 15 and 17 in the first control circuit is below the current limitations of standard thermostatic control means, thereby allowing the use of a mass produced, low cost thermostat.

To energize additional relays and gas valves in response to thermostatic control means 17, a second control circuit including transformer 56, control relays D/2 and E/3, gas valves 58 and 60 and a gas valve relay F/1 is provided. Relay D includes normally open switches D1 and D2. Relay E/3 includes normally open switches E1, E2 and E3. Relay F/1 includes normally open switch F1. Relays D/2 and E/3 are energized by the closing of switch B1. Gas valve relay F/1 and gas valves 58 and 60 are energized by the closing of control relay switch C1. The relays D/2, E/3 and F/1 and gas valves 58 and 60 which are energized by transformer 56 increase the number of relays and valves controlled by thermostatic means 17 without increasing the current flow through thermostatic switch contacts 44 and 46.

To energize an even greater number of relays and gas valves in response to thermostatic control means 17, a third control circuit including transformer 62, control relay G/2 and a gas valve 64 is provided. Relay G/2 is energized by the closing of switch E1. Gas valve 64 is energized by the closing of relay switch F1.

When heating is required in the zone served by thermostatic control means 15, the heating-cooling switch 66 is moved to the heating position as illustrated by the dotted line to provide current to thermostatic switch 42. Upon a drop in the temperature of the zone, switch 42 will close to provide current to gas valve 50 and provide gas to the burners associated therewith to provide heat to the zone.

When heating is required in the zone served by thermostatic control means 17, the heating-cooling switch 68 is moved to the heating position as illustrated by the dotted line to provide current to thermostatic switch 46. Upon a drop in the temperature of the zone, switch 46 will close to provide current to gas valve 52, and gas valve relay C/1. Gas valve relay C/1 will in turn close switch C1 to provide current to gas valves 58 and 60 and gas valve relay F/1, thereby closing switch F1 to provide current to gas valve 64.

It can be seen from the foregoing that thermostatic switch 46 controls gas valves 52, 58, 60 and 64 to energize the eight heating sections 2 serving the zone containing the thermostatic control means 17.

When cooling is required in the zone served by thermostatic control means 15, the heating-cooling switch 66 will be positioned as shown by the solid line to provide current to thermostatic switch 40. Upon a rise in temperature of the zone containing switch 40, the switch will close to provide current to relay A/2. Energization of relay A/2 will close switches A1 and A2 thereby providing current to the liquid line solenoid 70 to open the valve and allow passage of liquid refrigerant from condenser 18 to the coil 4 serving the zone containing thermostatic control means 15.

Relays H/1 and J/1 will also be energized by the closing of switch A1; energization of relay H/1 closing switch H1 to energize the compressor 16, energization of relay J/1 closing switch J1 to energize condenser fans 20. Thus, upon a demand for cooling, the compressor and condenser fan will be energized and the liquid line solenoid valve 70 will be opened to allow passage of liquid refrigerant from the condenser to the evaporator coil 4 serving the zone containing thermostatic control means 15.

When cooling is required in the zone served by thermostatic control means 17, the heat-cool switch 68 will be moved to the position illustrated by the solid line in FIG. 3 to provide current to thermostatic switch 44. Upon a rise in temperature of the zone containing thermostatic control means 17, switch 44 will close and energize relay B/3. Energization of relay B/3 will cause switches B1, B2 and B3 to close. Closing of switch B1 will complete a circuit through relays D/2 and E/3 which will in turn cause switches D1, D2, E1, E2 and E3 to close. Closing of switch E1 will provide current to relay G/2 which will close switches G1 and G2.

Thus, energization of relay B/3 will cause the subsequent energization of relays D/2, E/3 and G/2 and the switches associated therewith to energize relays H/1 and J/1 and open liquid line solenoid valves 72, 74, 76 and 78. Energization of relays H/1 and J/1 will close switches J1 and H1 to complete a circuit through the condenser fan motor and the compressor to provide high pressure liquid refrigerant through open solenoid valves 72, 74, 76 and 78 to the evaporator coils 4 to cool the air passing thereover.

It can be seen from the foregoing that control relays, energized by the thermostatic control means, are utilized to energize a second control circuit containing control relays which, if desired, can be utilized to energize a third control circuit. This control arrangement may be employed to energize a plurality of circuits, all controlled by a single thermostatic means which is required to carry a small fraction of the total current employed in the entire control system. Further, the number of relays or other electrical control devices in each control circuit may be selected to limit the current flow in each circuit while allowing an unlimited number of devices in the control system to be energized by a single thermostatic means simply by increasing the number of individual control circuits.

While I have described a preferred embodiment of my invention it is to be understood that the invention

I claim:

1. In a multizone heating and cooling system a method of utilizing low voltage, low power control circuits to control the temperature in a plurality of zones from the temperature sensed in one of the zones including the steps of:

sensing the temperature in a first zone with a low voltage temperature sensing device in a low voltage electrical temperature sensing circuit, and activating the low voltage circuit in response to the temperature sensed;

supplying heated or cooled air to the zone in response to activation of the low voltage circuit;

activating additional low voltage circuits in response to activation of the low voltage temperature sensing circuit; and supplying heated or cooled air to the zone associated with each low voltage circuit in response to the activation of the additional low voltage circuits.

* * * * *